(12) United States Patent
Kim et al.

(10) Patent No.: US 7,847,458 B2
(45) Date of Patent: Dec. 7, 2010

(54) MOTOR HAVING RIVETLESS ROTOR CORE

(75) Inventors: Hong Jung Kim, Cheongju-si (KR);
Sang Uk Park, Suwon-si (KR); Hyung Chul Lee, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 329 days.

(21) Appl. No.: 12/073,899

(22) Filed: Mar. 11, 2008

(65) Prior Publication Data
US 2008/0284271 A1 Nov. 20, 2008

(30) Foreign Application Priority Data
May 17, 2007 (KR) .................. 10-2007-0047969

(51) Int. Cl.
*H02K 1/27* (2006.01)
(52) U.S. Cl. .................. 310/156.22; 310/156.16; 310/216.058; 310/216.114
(58) Field of Classification Search .......... 310/156.16, 310/22, 53, 56, 59, 61, 154.03, 5, 14, 16–19, 310/217, 216.058, 85, 114, 116, 118, 129, 310/131, 135, 156.51; *H02K 1/27*
See application file for complete search history.

(56) References Cited

U.S. PATENT DOCUMENTS

| | | | | |
|---|---|---|---|---|
| 3,221,194 A | * | 11/1965 | Blackburn | 310/156.51 |
| 4,742,259 A | * | 5/1988 | Schaefer et al. | 310/156.28 |
| 5,157,297 A | * | 10/1992 | Uchida | 310/156.61 |
| 6,078,121 A | * | 6/2000 | Poag et al. | 310/91 |

FOREIGN PATENT DOCUMENTS

| | | |
|---|---|---|
| CN | 1251387 | 4/2006 |
| CN | 1925287 | 3/2007 |
| JP | 2003-088061 | 3/2003 |
| KR | 20-0161177 | 8/1999 |
| KR | 10-2000-0001926 | 1/2000 |
| KR | 20-2000-0002323 | 2/2000 |

OTHER PUBLICATIONS

Korean Office Action issued on Mar. 24, 2009 in corresponding Korean Patent Application 10-2007-0047969.
Chinese Office Action issued in corresponding Chinese Patent Application No. 200810086767.5.

* cited by examiner

*Primary Examiner*—Quyen Leung
*Assistant Examiner*—Naishadh N Desai
(74) *Attorney, Agent, or Firm*—Staas & Halsey LLP

(57) ABSTRACT

The motor includes a cylindrical rotor core, a plurality of magnets axially penetrated in the rotor core, a pair of separation-preventing plates installed at both ends of the rotor core, and at least one fixing member to fix the separation-preventing plates to the rotor core. The fixing member includes a rod portion extending in an axial direction of the rotor core to be disposed on an outer circumferential surface of the rotor core, and supporting portions bent from both ends of the rod portion and used to support the separation-preventing plates. The separation-preventing plates can be fixed to the rotor core by the fixing member disposed on the outer circumferential surface of the rotor core. The fixing member has no risk of hindering the flow of magnetic flux generated from the magnets, resulting in an improvement in the performance of the motor.

19 Claims, 4 Drawing Sheets

MOTOR HAVING RIVETLESS ROTOR CORE

CROSS-REFERENCE TO RELATED APPLICATIONS

This application claims the benefit of Korean Patent Application No. 2007-0047969, filed on May 17, 2007 in the Korean Intellectual Property Office, the disclosure of which is incorporated herein by reference.

BACKGROUND

1. Field

The present invention relates to a motor, and, more particularly, to a motor in which magnetic flux generated from magnets flows more efficiently through a rivetless rotor core.

2. Description of the Related Art

In general, a motor is a device to generate a rotating force upon receiving power. A conventional motor disclosed in Korean Utility Model Publication No. 20-0161177 includes a stator unit installed at a fixed position, a rotor unit rotatably installed in the stator unit to rotate by interaction with the stator unit, and a rotating shaft fixed at a rotating center of the rotor unit to rotate together with the rotor unit, so as to transmit a rotating force generated from the rotor unit to the outside.

The stator unit includes an annular bobbin having a plurality of teeth formed along an inner circumference thereof such that wires can be wound on the respective teeth to form coils. The rotor unit includes a rotor core formed by axially stacking disc-shaped steel plates one above another, a plurality of magnets installed to be axially penetrated in the rotor core at outer circumferential positions of the rotor core, and separation-preventing plates installed at both ends of the rotor core to keep the magnets in the rotor core at fixed positions. The separation-preventing plates are fixed to the rotor core by means of rivets as the rivets are axially penetrated through both the rotor core and the separation-preventing plates.

In the above described conventional motor, it is necessary to provide the rotor core with a plurality of rivet holes in an axial direction of the rotor core such that the rivets are penetrated through the rivet holes to install the separation-preventing plates. However, in the case where the rivet holes are axially formed in the rotor core and the rivets penetrate through the respective rivet holes, the flow of magnetic flux through the rotor core may be hindered, and consequently, results in deterioration in the performance of the motor.

Further, installing the separation-preventing plates to the rotor core of the conventional motor needs a very complicated operation because the plurality of rivet holes should be first formed in both the rotor core and the separation-preventing plates, and then, the rivets are fastened through the respective rivet holes one by one.

SUMMARY

Accordingly, it is an aspect of the invention to provide a motor in which magnetic flux generated from magnets can flow more efficiently through a rotor core, resulting in an improvement in the performance of the motor.

It is a further aspect of the invention to provide a motor in which separation-preventing plates can be fixed to a rotor core in a more simplified manner.

Additional aspects and/or advantages of the invention will be set forth in part in the description which follows and, in part, will be apparent from the description, or may be learned by practice of the invention.

In accordance with an aspect of the invention, the above and/or other aspects can be achieved by the provision of a motor including a cylindrical rotor core, a plurality of magnets axially penetrated in the rotor core, a pair of separation-preventing plates installed at both ends of the rotor core, and at least one fixing member to fix the separation-preventing plates to the rotor core, wherein the fixing member includes a rod portion extending in an axial direction of the rotor core to be disposed on an outer circumferential surface of the rotor core, and supporting portions bent from both ends of the rod portion and used to support the separation-preventing plates.

A first insertion groove to receive the rod portion may be axially formed lengthwise in the outer circumference surface of the rotor core.

A second insertion groove to receive the rod portion may be formed in an outer circumference of each separation-preventing plate at a position corresponding to the first insertion groove.

The plurality of magnets may be arranged in the rotor core such that they are circumferentially spaced apart from each other, and the rod portion may be positioned on the outer circumferential surface of the rotor core at a position between distal ends of the neighboring two magnets.

Each supporting portion may include a fixing boss protruding toward the corresponding separation-preventing plate, and the separation-preventing plate may include a fixing hole to receive the fixing boss.

The separation-preventing plate may include at least one seating groove dented in a surface thereof to extend from the fixing hole to the second insertion groove, to allow the corresponding supporting portion to be seated in the seating groove.

The at least one seating groove may include a pair of seating grooves formed in the separation-preventing plate at both side positions thereof to extend parallel to each other in a direction orthogonal to a radial direction of the separation-preventing plate, and each supporting portion may be introduced into either side of each seating groove so as to be seated in the seating groove.

The at least one fixing member may include a pair of fixing members, and the corresponding supporting portions of the two fixing members may be connected to each other such that the fixing members have a rectangular ring shape.

The supporting portion may be fixed to the seating groove by welding.

In accordance with another aspect of the invention, there is provided a motor including a cylindrical rotor core, a plurality of magnets axially penetrated in the rotor core, a pair of separation-preventing plates installed at both ends of the rotor core, and at least one fixing member installed to surround an outer circumference of the rotor core, so as to keep the separation-preventing plates at fixed positions on both the ends of the rotor core.

The fixing member may include a rod portion extending in an axial direction of the rotor core to be disposed on an outer circumferential surface of the rotor core, and supporting portions bent from both ends of the rod portion and used to support the pair of separation-preventing plates.

In accordance with yet another aspect of the invention, there is provided a motor including a cylindrical rotor core, a plurality of magnets axially penetrated in the rotor core, a pair of separation-preventing plates installed to both ends of the rotor core, and a pair of fixing members each having a rectangular ring shape and installed to surround the rotor core and the separation-preventing plates so as to fix the separation-preventing plates to the rotor core.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE EMBODIMENTS

Figure 1:
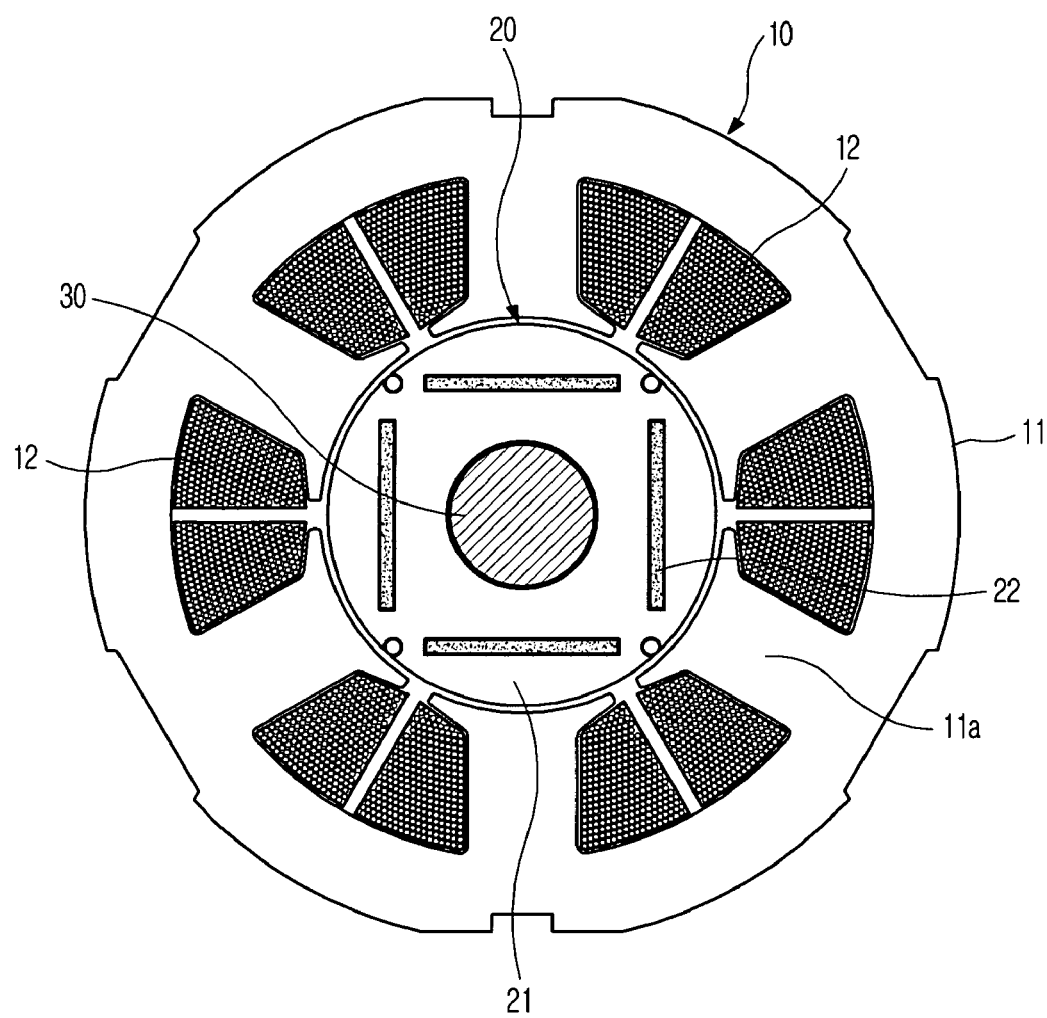
FIG. 1 is a sectional view showing the configuration of a motor according to the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Referring to FIG. 1 illustrating a motor according to a preferred embodiment of the present invention, the motor includes a cylindrical stator unit 10 installed at a fixed position, a rotor unit 20 rotatably installed in the stator unit 10 to rotate by interaction with the stator unit 10, and a rotating shaft 30 fixed in the center of the rotor unit 20 to transmit a rotating force generated from the rotor unit 20 to the outside.

Figure 2:
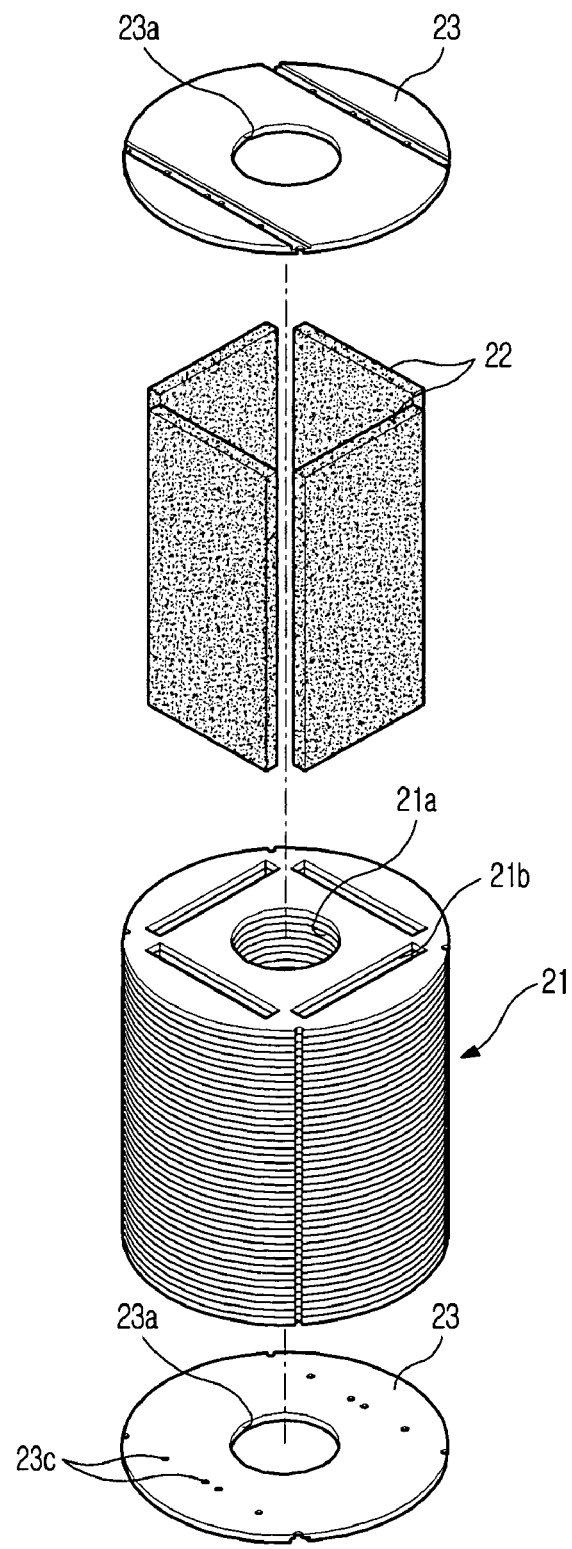
FIG. 2 is an exploded perspective view showing a rotor unit provided in the motor according to the present invention.

The stator unit 10 includes a bobbin 11 having a plurality of teeth 11a protruding from an inner circumferential surface thereof such that wires are wound on the teeth 11a to form coils 12. The rotor unit 20, as shown in FIG. 2, includes a rotor core 21 formed by stacking a plurality of disc-shaped steel plates in an axial direction, a plurality of magnets 22 to be axially penetrated in the rotor core 21 at outer circumferential positions of the core 21 to generate magnetic flux, and a pair of separation-preventing plates 23 to come into close contact with both ends of the rotor core 21 to keep the magnets 22 in the rotor core 21 at fixed positions. The rotor core 21 and each separation-preventing plate 23 are centrally perforated, respectively, with a first rotating shaft installation aperture 21a and a second rotating shaft installation aperture 23a, to allow the rotating shaft 30 to be penetrated through the apertures 21a and 23a. The magnets 22 are mounted in the rotor core 21 at the outer circumferential positions of the rotor core 21 such that the magnets 22 are circumferentially spaced apart from each other by a predetermined distance. For this, the rotor core 21 has a plurality of magnet installation holes 21b perforated in the outer circumferential positions thereof for the penetration of the respective magnets 22. The magnet installation holes 21b are spaced apart from each other by a predetermined distance in a circumferential direction of the rotor core 21. In the present embodiment, the magnet installation holes 21b extend in a direction orthogonal to a radial direction of the rotor core 21, and consequently, the magnets 22 are installed in the outer circumferential positions of the rotor core 21 in a direction orthogonal to the radial direction of the rotor core 21.

Figure 3:
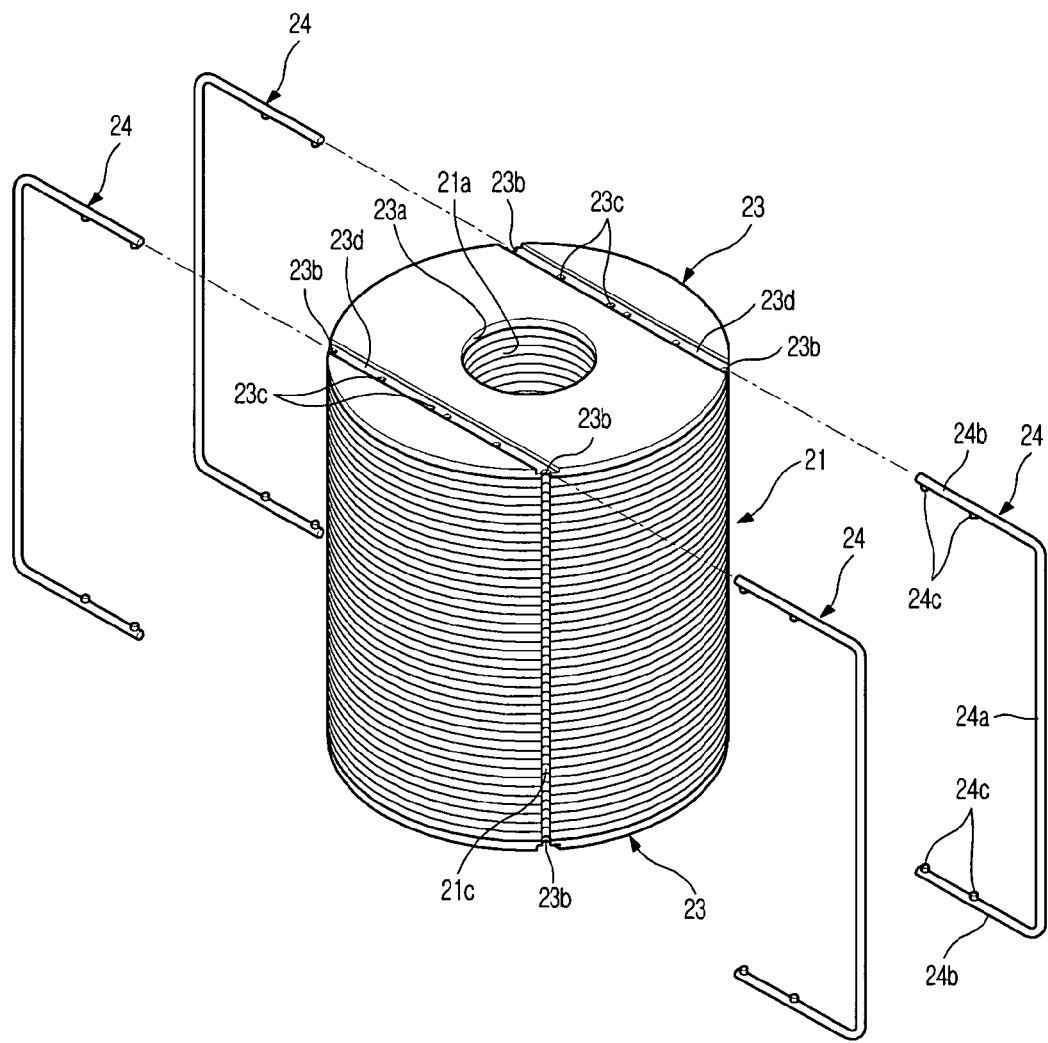
FIG. 3 is an exploded perspective view showing fixing members to be coupled to a rotor core provided in the motor according to the present invention.

The motor according to the present invention, as shown in FIG. 3, further includes fixing members 24 to fix the separation-preventing plates 23 to the rotor core 21. The fixing members 24 are arranged around the rotor core 21 to surround the rotor core 21 and the separation-preventing plates 23 without a risk of preventing the flow of magnetic flux through the rotor core 21, thereby fixing the separation-preventing plates 23 to the rotor core 21.

To be installed around the rotor core 21, each fixing member 24 includes a bar-shaped rod portion 24a extending lengthwise in an axial direction of the rotor core 21 so as to be disposed on an outer circumferential surface of the rotor core 21, and a pair of supporting portions 24b bent from both ends of the rod portion 24a to support the two separation-preventing plates 23 which come into close contact with both the ends of the rotor core 21. The two separation-preventing plates 23 can be kept in close contact with both the ends of the rotor core 21 by the pair of supporting portions 24b. To keep the supporting portions 24b of the fixing member 24 to come into contact with the separation-preventing plates 23, the supporting portions 24b have fixing bosses 24c to protrude toward the separation-preventing plates 23, and the separation-preventing plates 23 have fixing holes 23c for the insertion of the fixing bosses 24c. In the present embodiment, each supporting portion 24b has a pair of the fixing bosses 24c, and each separation-preventing plate 23 has a plurality of pairs of the fixing holes 23c such that the pairs of fixing bosses 24c formed at the plurality of supporting portions 24b are inserted into the fixing holes 23c, respectively.

The rod portion 24a of each fixing member 24 is disposed on the outer circumferential surface of the rotor core 21 at a position between distal ends of the neighboring two magnets 22. This arrangement has the effect of substantially preventing the fixing member 24 having an effect on the flow of magnetic flux generated from the magnets 22. In the present embodiment, since there are provided four magnets 22, a total of four fixing members 24 are provided such that the rod portions 24a of the fixing members 24 can be disposed on the outer circumferential surface of the rotor core 21 at positions between the distal ends of the four magnets 22.

To prevent the rod portions 24a of the fixing members 24 from protruding outward from the rotor core 21 in a radial direction of the rotor core 21, the rotor core 21 has first insertion grooves 21c axially formed lengthwise in the outer circumferential surface thereof to receive the rod portions 24a. The separation-preventing plates 23 have second insertion grooves 23b for the insertion of the rod portions 24a. The second insertion grooves 23b are formed in an outer circumference of the separation-preventing plate 23 at positions corresponding to the first insertion grooves 21c.

The separation-preventing plates 23 also have seating grooves 23d dented in a surface thereof to extend lengthwise from the fixing holes 23c to the outer circumference of the separation-preventing plate 23, to facilitate easy insertion of the fixing bosses 24c into the fixing holes 23c. In the present embodiment, each separation-preventing plate 23 has a pair of the seating grooves 23d formed at both side positions thereof such that the seating grooves 23d extend parallel to each other in a direction orthogonal to a radial direction of the separation-preventing plate 23. With this configuration, the supporting portions 24b of the two fixing members 24 are introduced into the single seating groove 23d from both sides of the seating groove 23d so as to be seated in the seating groove 23d. Preferably, to more stably fix the separation-preventing plates 23 by use of the fixing members 24, the supporting portions 24b seated in the seating groove 23d are welded to the seating groove 23d. Also, the seating grooves 23d formed in the two separation-preventing plates 23 extend from the fixing holes 23c to the second insertion grooves 23b formed in the outer circumference of the respective separation-preventing plates 23. With this configuration, the rod portions 24a can be inserted into the second insertion grooves 23b as the fixing bosses 24c are inserted into the fixing holes 23c.

Specifically, the pair of supporting portions 24b formed at both the ends of each fixing member 24 are elastically deformed temporarily to move the fixing bosses 24c formed at the supporting portions 24b along the seating grooves 23d. Thereby, the supporting portions 24b can be seated in the seating grooves 23d and the fixing bosses 24c can be inserted into the fixing holes 23c. Simultaneously, the rod portions 24a can be inserted into the first insertion grooves 21c and the second insertion grooves 23b. Thereafter, as the supporting portions 24b are welded to the seating grooves 23d, the fixing member 24 can be simply mounted around the rotor core 21 and can fix the separation-preventing plates 23 to the rotor core 21.

Figure 4:
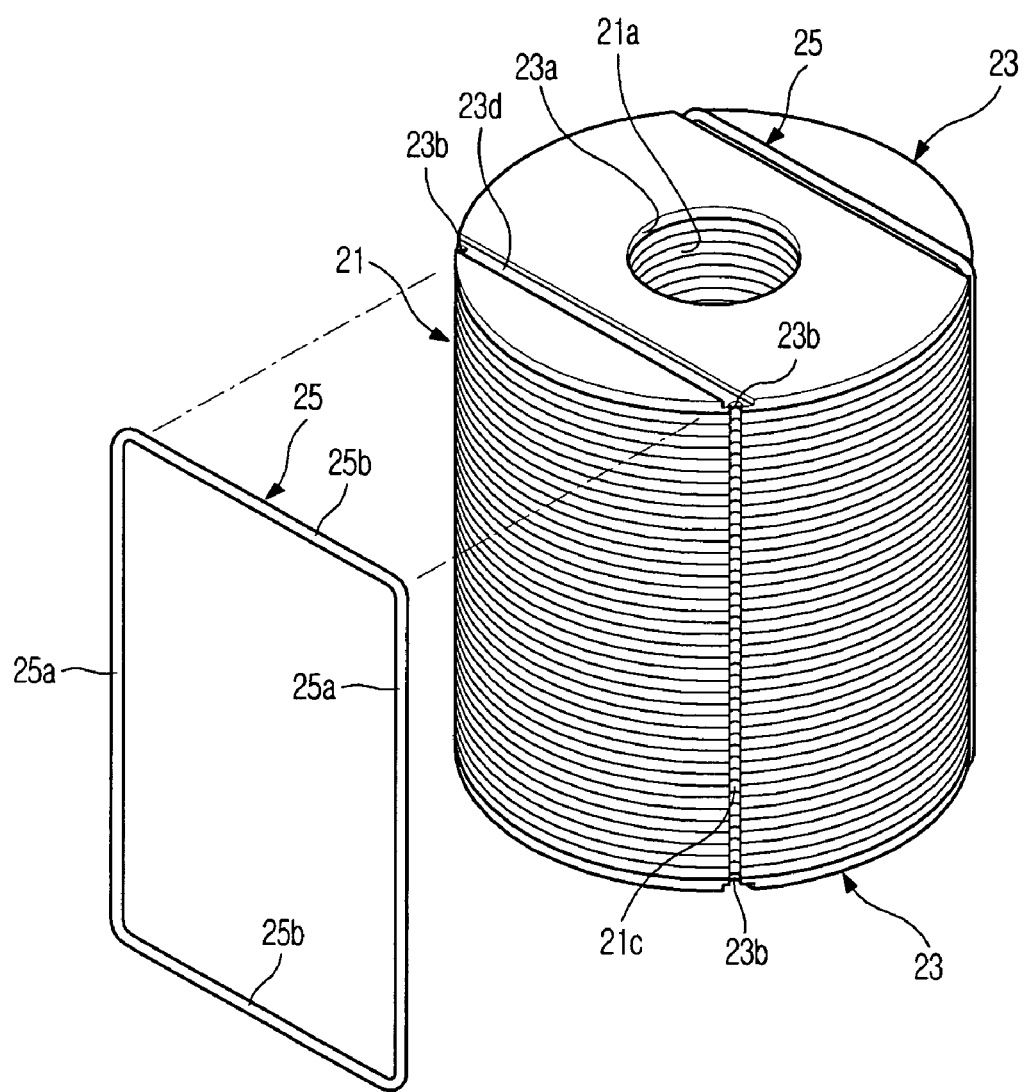
FIG. 4 is an exploded perspective view showing fixing members to be coupled to the rotor core of the motor according to another embodiment of the present invention.

Although the above described embodiment illustrates that the supporting portions 24b of the two fixing members 24 are introduced into the single seating groove 23d from both the ends of the seating groove 23d, the present invention is not limited thereto. Alternatively, it may be considered that the supporting portions 24b of the pair of fixing members 24 are connected to each other, to provide the fixing members 24 with a rectangular ring shape. In another embodiment of the present invention as shown in FIG. 4, there is provided a square ring-shaped fixing member 25 having two rod portions 25a and two supporting portions 25b. In this case, the rod portions 25a are interference-fitted into the first insertion holes 21c and the second insertion holes 23b, and the supporting portions 25b are also interference-fitted into the seating grooves 23d, to fix the separation-preventing plates 23 to the rotor core 21.

As apparent from the above description, a motor according the present invention includes fixing members to be installed around a rotor core to fix separation-preventing plates to the rotor core. The fixing members of the present invention have no risk of hindering the flow of magnetic flux generated from magnets, and can result in an improvement in the performance of the motor.

Further, according to the present invention, each fixing member includes a rod portion and supporting portions having fixing bosses. As the supporting portions of the fixing member are moved along seating grooves of the separation-preventing plates, the fixing bosses are inserted into fixing holes of the separation-preventing plates and the rod portion is inserted into first and second insertion holes, respectively, formed in the rotor core and the separation-preventing plates. With the use of the fixing member having the above described configuration, the separation-preventing plates can be fixed to the rotor core very simply.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A motor comprising a cylindrical rotor core, a plurality of magnets axially penetrated in the rotor core, a pair of separation-preventing plates installed at both ends of the rotor core, and at least one fixing member to fix the separation-preventing plates to the rotor core, wherein the fixing member comprises:
a rod portion extending in an axial direction of the rotor core to be disposed on an outer circumferential surface of the rotor core, and
supporting portions bent from both ends of the rod portion and used to support the separation-preventing plates,
wherein a first insertion groove to receive the rod portion is axially formed lengthwise in the outer circumference surface of the rotor core.

2. The motor according to claim 1, wherein a second insertion groove to receive the rod portion is formed in an outer circumference of each separation-preventing plate at a position corresponding to the first insertion groove.

3. A motor comprising a cylindrical rotor core, a plurality of magnets axially penetrated in the rotor core, a pair of separation-preventing plates installed at both ends of the rotor core, and at least one fixing member to fix the separation-preventing plates to the rotor core, wherein the fixing member comprises:
a rod portion extending in an axial direction of the rotor core to be disposed on an outer circumferential surface of the rotor core, and
supporting portions bent from both ends of the rod portion and used to support the separation-preventing plates,
wherein the plurality of magnets are arranged in the rotor core such that they are circumferentially spaced apart from each other, and
the rod portion is positioned on the outer circumferential surface of the rotor core at a position between distal ends of the neighboring two magnets.

4. The motor according to claim 2, wherein each supporting portion comprises a fixing boss protruding toward the corresponding separation-preventing plate, and
the separation-preventing plate comprises a fixing hole to receive the fixing boss.

5. The motor according to claim 4, wherein the separation-preventing plate comprises at least one seating groove dented in a surface thereof to extend from the fixing hole to the second insertion groove, to allow the corresponding supporting portion to be seated in the seating groove.

6. The motor according to claim 5, wherein the at least one seating groove comprises a pair of seating grooves formed in the separation-preventing plate at both side positions thereof to extend parallel to each other in a direction orthogonal to a radial direction of the separation-preventing plate, and each supporting portion is introduced into either side of each seating groove so as to be seated in the seating groove.

7. A motor comprising a cylindrical rotor core, a plurality of magnets axially penetrated in the rotor core, a pair of separation-preventing plates installed at both ends of the rotor core, and at least one fixing member to fix the separation-preventing plates to the rotor core, wherein the fixing member comprises:
a rod portion extending in an axial direction of the rotor core to be disposed on an outer circumferential surface of the rotor core, and
supporting portions bent from both ends of the rod portion and used to support the separation-preventing plates,
wherein the at least one fixing member comprises a pair of fixing members, and
the corresponding supporting portions of the two fixing members are connected to each other such that the fixing members have a rectangular ring shape.

8. The motor according to claim 5, wherein the supporting portion is fixed to the seating groove by welding.

9. A motor comprising:
a cylindrical rotor core;
a plurality of magnets axially penetrated in the rotor core;
a pair of separation-preventing plates installed at both ends of the rotor core; and at least one fixing member installed to surround an outer circumference of the rotor core, so as to keep the separation-preventing plates at fixed positions on both the ends of the rotor core, wherein the fixing member comprises
- a rod portion extending in an axial direction of the rotor core to be disposed on an outer circumferential surface of the rotor core, and
- supporting portions bent from both ends of the rod portion and used to support the pair of separation-preventing plates,
- wherein a first insertion groove to receive the rod portion is axially formed lengthwise in the outer circumference surface of the rotor core, and
- a second insertion groove to receive the rod portion is formed in an outer circumference of each separation-preventing plate at a position corresponding to the first insertion groove.

10. The motor according to claim 9, wherein the plurality of magnets are arranged in the rotor core such that they are circumferentially spaced apart from each other, and
the rod portion is positioned on the outer circumferential surface of the rotor core at a position between distal ends of the neighboring two magnets.

11. The motor according to claim 9, wherein each supporting portion comprises a fixing boss protruding toward the corresponding separation-preventing plate, and
the separation-preventing plate comprises a fixing hole to receive the fixing boss.

12. The motor according to claim 11, wherein the separation-preventing plate comprises at least one seating groove dented in a surface thereof to extend from the fixing hole to the second insertion groove, to allow the corresponding supporting portion to be seated in the seating groove.

13. The motor according to claim 12, wherein the at least one seating groove comprises a pair of seating grooves formed in the separation-preventing plate at both side positions thereof to extend parallel to each other in a direction orthogonal to a radial direction of the separation-preventing plate, and
each supporting portion is introduced into either side of each seating groove so as to be seated in the seating groove.

14. A motor comprising:
a cylindrical rotor core;
a plurality of magnets axially penetrated in the rotor core;
a pair of separation-preventing plates installed at both ends of the rotor core; and
at least one fixing member installed to surround an outer circumference of the rotor core, so as to keep the separation-preventing plates at fixed positions on both the ends of the rotor core,
wherein the fixing member comprises
- a rod portion extending in an axial direction of the rotor core to be disposed on an outer circumferential surface of the rotor core, and
- supporting portions bent from both ends of the rod portion and used to support the pair of separation-preventing plates,
- wherein the at least one fixing member comprises a pair of fixing members, and
- the corresponding supporting portions of the two fixing members are connected to each other such that the fixing members have a rectangular ring shape.

15. The motor according to claim 12, wherein the supporting portion is fixed to the seating groove by welding.

16. A motor comprising:
a cylindrical rotor core;
a plurality of magnets axially penetrated in the rotor core;
a pair of separation-preventing plates installed to both ends of the rotor core; and
a pair of fixing members each having a rectangular ring shape and installed to surround the rotor core and the separation-preventing plates so as to fix the separation-preventing plates to the rotor core,
wherein each of the pair of fixing members comprises
- a pair of rod portions extending in an axial direction of the rotor core to be disposed on an outer circumferential surface of the rotor core, and
- a pair of supporting portions bent from both ends of each of the pair of rod portions and used to support the pair of separation-preventing plates,
- wherein first insertion grooves to receive the respective rod portions are axially formed lengthwise in the outer circumference surface of the rotor core, and
- second insertion grooves to receive the respective rod portions are formed in an outer circumference of each separation-preventing plate at positions corresponding to the first insertion grooves.

17. A motor comprising:
a cylindrical rotor core;
a plurality of magnets axially penetrated in the rotor core;
a pair of separation-preventing plates installed to both ends of the rotor core; and
a pair of fixing members each having a rectangular ring shape and installed to surround the rotor core and the separation-preventing plates so as to fix the separation-preventing plates to the rotor core,
wherein each of the pair of fixing members comprises
- a pair of rod portions extending in an axial direction of the rotor core to be disposed on an outer circumferential surface of the rotor core, and
- a pair of supporting portions bent from both ends of each of the pair of rod portions and used to support the pair of separation-preventing plates
- wherein each of the separation-preventing plates comprises seating grooves dented in a surface thereof, each seating groove extending from a fixing hole, formed in the separation-preventing plate, to an outer circumference of the separation-preventing plate, to allow the corresponding supporting portion to be seated in the seating groove.

18. The motor according to claim 17, wherein the seating grooves comprise a pair of seating grooves formed in each separation-preventing plate at both side positions thereof to extend parallel to each other in a direction orthogonal to a radial direction of the separation-preventing plate.

19. The motor according to claim 17, wherein the supporting portion is fixed to the seating groove by welding.

* * * * *

UNITED STATES PATENT AND TRADEMARK OFFICE
CERTIFICATE OF CORRECTION

| | | |
|---|---|---|
| PATENT NO. | : 7,847,458 B2 | |
| APPLICATION NO. | : 12/073899 | |
| DATED | : December 7, 2010 | |
| INVENTOR(S) | : Hong Jung Kim et al. | |

It is certified that error appears in the above-identified patent and that said Letters Patent is hereby corrected as shown below:

Column 8, Line 45 (Approx.), in Claim 17, delete "plates" and insert --plates,--, therefor.

Signed and Sealed this
Fifteenth Day of March, 2011

David J. Kappos
*Director of the United States Patent and Trademark Office*